Patented Aug. 5, 1941

2,251,486

UNITED STATES PATENT OFFICE 2,251,486

COLORING VINYLIDENE CHLORIDE POLYMERS

Alden W. Hanson, Midland, Mich., assignor to The Dow Chemical Company, Midland, Mich., a corporation of Michigan No Drawing. Application December 16, 1940, Serial No. 370,358

6 Claims. (Cl. 8—17)

The present invention relates to a method of coloring vinylidene chloride polymers.

Many polymeric substances can be colored either by incorporation of a dye or pigment in the monomer from which the polymer is produced or by mixing the polymerized product in any of several known manners with a solution or suspension of a dye or pigment. The problem of producing colored articles from vinylidene chloride polymers and co-polymers is made difficult owing to the fact that most dyes are inhibitors of the polymerization of vinylidene chloride and hence a colored polymer cannot easily be made from a colored monomer. In the fully fabricated form, most vinylidene chloride polymers are too inert to the action of solvents to absorb coloring matter from dye solutions. Many of the vinylidene chloride polymers, in order to be molded or extruded, must be subjected to temperatures at which many of the otherwise satisfactory dyes become unstable and change color. It is, therefore, not practical to incorporate a dye in a vinylidene chloride polymer which is subsequently to be molded or extruded. In addition, it has been observed that pigments tend to accelerate decomposition of vinylidene chloride polymers at elevated temperatures. It is still desired, however, to provide a means for coloring vinylidene chloride polymers, preferably after any working operations, which may involve the use of high temperatures, have been completed.

In order to make clear the conditions under which the operations of the present invention are to be carried out a description of the unique properties of vinylidene chloride polymers will be given. For further discussion of this same point reference is made to an R. M. Wiley Patent No. 2,183,602, and co-pending Wiley application, Serial No. 309,609, filed December 16, 1939.

Most synthetic resins and polymers are amorphous whether they are examined visually, microscopically, or by X-ray diffraction methods. Likewise, most such resins and polymers cannot be made to crystallize, nor can articles therefrom be greatly altered or improved as to strength characteristics by simple working operations intended to align or orient the molecules therein. In contrast to most synthetic resins and polymers, polymeric vinylidene chloride is crystalline, not in its external appearance but rather when examined by X-ray diffraction methods. Similarly, the co-polymers of vinylidene chloride, wherein vinylidene chloride is the major co-polymerized constituent, commonly are crystalline on X-ray examination.

When polymeric vinylidene chloride and vinylidene chloride co-polymers are first prepared, they are commonly obtained as white opaque solids. When heated to temperatures above their respective softening points, they are converted to transparent semi-fluid or liquid masses. When cooled, preferably quite rapidly, the polymer or co-polymer congeals and retains the transparency or translucency which it acquired when first melted. The congealed polymeric body retains the shape of the vessel in which it was formed, so long as it is undisturbed. We refer to the initial congealed state as the "supercooled" state in which the normally crystalline vinylidene chloride polymers and co-polymers have little strength, and any few crystals which may be present are indicated by X-ray diffraction patterns to have a random arrangement. If the supercooled polymeric body is allowed to stand long enough or if it is plastically deformed, it crystallizes, or "sets", losing its ability to be further deformed easily at room temperature, and thus gains considerable strength. From this time on, the polymer continues to exhibit crystallinity until such time as it may again be fused.

All of the polymers and co-polymers which exhibit crystallinity under X-ray examination while in the "set" condition are referred to herein as "normally crystalline polymers." It has been found that in the crystalline state, whether oriented or merely "set," these polymers are only capable of being colored with great difficulty and then only superficially.

It is, accordingly, an object of the invention to provide a method whereby normally crystalline vinylidene chloride polymers may be colored easily. It is another object to provide a method whereby such polymers may be permanently dyed or pigmented with coloring materials which might be injuriously affected by high temperature conditions employed in molding or extruding the polymers. Yet another object is to provide a method as aforesaid whereby colored articles may be produced from normally crystalline vinylidene chloride polymers, the said articles retaining their color during subsequent working operations performed thereon.

The present invention, then, resides in the discovery that the foregoing and related objects may be attained by applying the coloring agent, whether it be a dye or a pigment, to the body of a normally crystalline vinylidene chloride polymer while that polymer is in the supercooled condition. The coloring agent is applied while dissolved or suspended in a volatile organic liquid which has at least the ability to wet the surface of the polymer. The supercooled polymer readily absorbs coloring matter from the vehicle, and in this respect is in marked contrast with the crystallized forms of the polymer. Particularly effective volatile liquids for the purpose are those disclosed as solvents by R. C. Reinhardt and J. H. Reilly in their co-pending application, Serial No. 240,661, filed November 16, 1938. Examples of such liquids are dioxane, cyclohexanone, mesityl oxide, methyl isobutyl ketone, heptanone-2, acetophenone, dichloro-diethyl ether, and mixtures thereof with one another or with other volatile media which wet the polymer but which do not dissolve the same, such as carbon tetrachloride or acetone, or the like.

The actual operation whereby the coloring matter is introduced into the polymer may be carried out at any temperature below the congelation point of the polymer but usually above room temperature. In this temperature range the polymer while still supercooled is particularly receptive to the introduction of coloring matter, or of stabilizers, plasticizers or other modifiers.

When the coloring agent employed is not soluble in the volatile liquid medium, it has been found desirable to dissolve in that medium a small amount of a soft and somewhat readily soluble vinylidene chloride co-polymer to form a lacquer in which the coloring agent may be suspended or dispersed, and which serves to promote surface-wetting of the polymeric article to be colored, and thus to bring the said article and coloring agent into intimate contact with one another.

In the case of dyes which are soluble in the volatile liquid, various intensities of color can be embodied in the dyed article either by variation in the solution concentration or, more especially, by variation of the proportions of volatile ingredients in the solvent itself. Thus, a dye dissolved in dioxane alone may give one intensity while, when dissolved in a mixture of equal parts of dioxane and acetone, it may give another intensity of color to the dyed polymeric article. The time of immersion in the dye bath also controls or modifies the color intensity.

Following is a list of a number of dyes, each of which have been applied to supercooled forms of normally crystalline vinylidene chloride polymers. The dyes were used in the form of solutions in dioxane having concentrations in the range from 0.05 per cent to about 1 per cent.

Oil Green M255, Color Index No. 1298
Ciba Oil Red, Color Index No. 73
Cibacete Red, Schultz, 7th ed., vol. 2, page 61
Cibacete Violet, Schultz, 7th ed., vol. 2, page 61
Yellow 5G, Schultz No. 935
Cibacete Blue BR, Schultz, 7th ed., vol. 2, page 60
Oil Orange 2311, Schultz No. 33, Color Index No. 24
Oil Blue Base, Schultz No. 982

Each of the dyes above listed was used in a manner which is clearly illustrated in the following example.

Example

A co-polymer consisting of about 90 per cent vinylidene chloride and 10 per cent vinyl chloride, plasticized with about 7 per cent of its weight of di-(alpha-phenyl-ethyl) ether, and having a softening point in the plasticized state of about 160° C., was heated to a temperature of about 175° C. in the chamber of an extrusion press. A plurality of strands of the composition were simultaneously extruded through a suitable die, and were chilled in a water bath near the extrusion orifice. This bath supercooled the strands and reduced their temperature to about 30° C. From the cooling bath the extruded filaments were conveyed into and through a 1 per cent suspension of Oil Orange 2311 in dioxane. The dye bath was so arranged that the continuously moving strands of extruded and supercooled material passing therethrough were in contact with the coloring solution for a period of about 5 seconds. The supercooled polymer readily absorbed the dye and when samples thereof were dried to remove solvent the article exhibited a color of satisfactory intensity, both on its surface and within the strand, as was shown by studies of cross-sectional segments removed from the treated article. After the filaments had been conveyed through the dye bath they were stretched at room temperature to about ½ their former diameter or to about four times their length per unit mass when first extruded. This stretching effected a crystallization and orientation of the polymeric material. The final stretched strands were uniformly colored.

In a manner similar to that just described a plurality of strands were extruded from a single extrusion press and passed individually through separate dye baths containing a variety of dyes. This treatment was carried out in a continuous manner as was that of the above example, and after the strands had passed through the dye baths they were reassembled and twisted with stretching to form oriented composite multicolored cordage of attractive appearance. The composite twisted article presented a sparkling appearance, reflecting light from the facets formed by the distortion of the strands where they had been twisted together.

In like manner, other dyes and various pigment colors were applied to supercooled forms of normally crystalline vinylidene chloride polymers. The insoluble dyes and pigments were dispersed in a volatile organic liquid, and, in most cases, a soft readily soluble vinylidene chloride co-polymer was dissolved therein to aid in dispersing the pigment. The color produced in the vinylidene chloride article was, in each case, a reproduction of the normal color of the pigment or dye employed. Subsequent cold working operations performed on the supercooled article did not alter the color which had been imparted thereto but, in some cases, particularly where the thickness of the article was altered, these operations modified the intensity of the color.

Attempts to apply dyes and pigments to vinylidene chloride polymers while they were in a crystalline state were uniformly unsuccessful, even when employing the same solutions or suspension of dyes shown above to work successfully in connection with the supercooled polymers.

This application is a continuation-in-part of my prior application Serial No. 290,792, filed August 18, 1939.

I claim:

1. The method of coloring normally crystalline vinylidene chloride polymers which comprises providing a supercooled form of such polymer and bringing the same into contact with a coloring agent dispersed in a volatile organic liquid which wets the surface of the polymer.

2. The method of coloring normally crystalline vinylidene chloride polymers which comprises providing a supercooled form of such polymer and bringing the same into contact with a dye dispersed in a volatile organic liquid which wets the surface of the polymer.

3. The method of coloring normally crystalline vinylidene chloride polymers which comprises providing a supercooled form of such polymer and bringing the same into contact with a dye dispersed in dioxane.

4. The method of coloring filaments of normally crystalline vinylidene chloride polymers which comprises providing a supercooled strand of such polymer, bringing the strand into contact with a dioxane dispersion of a dye, removing the so-colored strand from the dye bath, and stretching the strand at room temperature to produce a crystallized and oriented, colored filament of the said polymer.

5. The method of coloring a normally crystalline co-polymer of vinylidene chloride and vinyl chloride which comprises providing a supercooled form of such co-polymer and bringing the same into contact with a dye dispersed in a volatile organic liquid which wets the surface of the polymer.

6. The method of coloring filaments of a normally crystalline co-polymer of vinylidene chloride and vinyl chloride which comprises providing a supercooled strand of such co-polymer, bringing the strand into contact with a dioxane dispersion of a dye, removing the so-colored strand from the dye bath, and stretching the strand at room temperature to produce a crystallized and oriented colored filament of the said polymer.

ALDEN W. HANSON.